United States Patent
Ferro et al.

(10) Patent No.: US 11,272,384 B2
(45) Date of Patent: Mar. 8, 2022

(54) SYSTEMS AND METHODS FOR INCREASING THE RELIABILITY OF A WIRELESS COMMUNICATION CONNECTION

(71) Applicant: Honeywell International Inc., Morristown, NJ (US)

(72) Inventors: Philip Ferro, Setauket, NY (US); Alice DeBiasio, Smithtown, NY (US); Robert Adonailo, Rockville Centre, NY (US)

(73) Assignee: Honeywell International Inc., Charlotte, NC (US)

(*) Notice: Subject to any disclaimer, the term of this patent is extended or adjusted under 35 U.S.C. 154(b) by 134 days.

(21) Appl. No.: 16/055,438

(22) Filed: Aug. 6, 2018

(65) Prior Publication Data

US 2019/0053077 A1 Feb. 14, 2019

Related U.S. Application Data

(60) Provisional application No. 62/544,275, filed on Aug. 11, 2017.

(51) Int. Cl.
*H04W 24/04* (2009.01)
*G08B 25/10* (2006.01)
(Continued)

(52) U.S. Cl.
CPC ............ *H04W 24/04* (2013.01); *G08B 25/10* (2013.01); *G08B 29/06* (2013.01);
(Continued)

(58) Field of Classification Search
CPC ...... G08B 29/06; H04W 24/04; H04W 24/08; H04L 41/0654
See application file for complete search history.

(56) References Cited

U.S. PATENT DOCUMENTS 8,204,990 B1 6/2012 James et al.
10,164,858 B2 * 12/2018 Gunasekara ............ H04L 43/10
(Continued)

FOREIGN PATENT DOCUMENTS

DE 102004039026 B3 6/2006
EP 2677835 A1 12/2013

OTHER PUBLICATIONS

Extended Search Report and Opinion from related European Application No. 18/188,288, dated Jan. 9, 2019, 7 pages.
(Continued)

*Primary Examiner* — Shukri Taha
(74) *Attorney, Agent, or Firm* — Brooks, Cameron & Huebsch, PLLC

(57) ABSTRACT

Systems and methods for increasing the reliability of a wireless communication connection in a connected system are provided. Such systems and methods can include a control panel, a wireless access point that connects the control panel to the Internet via a first wireless communication connection, and a connection reliability module coupled to the wireless access point. In some embodiments, when the control panel detects a fault on the first wireless communication connection, the control panel can transmit a signal to the connection reliability module via a second wireless connection that is different than the first wireless connection, and responsive to receiving the signal, the connection reliability module can power cycle the wireless access point.

19 Claims, 2 Drawing Sheets

(51) Int. Cl.
*G08B 29/06* (2006.01)
*H04L 41/0654* (2022.01)
*H04W 24/08* (2009.01)
*H04W 52/02* (2009.01)

(52) U.S. Cl.
CPC ......... *H04L 41/0654* (2013.01); *H04W 24/08* (2013.01); *H04W 52/0206* (2013.01)

(56) References Cited

U.S. PATENT DOCUMENTS

| | | | | |
|---|---|---|---|---|
| 2004/0073847 | A1* | 4/2004 | Booth | H04W 52/287 |
| | | | | 714/43 |
| 2008/0027587 | A1* | 1/2008 | Nickerson | A01G 25/16 |
| | | | | 700/284 |
| 2011/0035624 | A1* | 2/2011 | Miller | G06F 11/0793 |
| | | | | 714/15 |
| 2012/0278654 | A1* | 11/2012 | Shen | G06F 11/0793 |
| | | | | 714/23 |
| 2015/0245229 | A1* | 8/2015 | Gu | H04L 41/0668 |
| | | | | 455/419 |
| 2016/0043827 | A1* | 2/2016 | Filson | H04K 3/226 |
| | | | | 370/252 |
| 2018/0152579 | A1* | 5/2018 | Iwasa | H04N 1/00891 |
| 2019/0123955 | A1* | 4/2019 | Chan | G06F 11/1438 |

OTHER PUBLICATIONS

Communication Pursuant to Article 94(3) EPC Exam Report for related EP Application No. 18188288.7, dated Apr. 29, 2021 (5 pgs).

* cited by examiner

SYSTEMS AND METHODS FOR INCREASING THE RELIABILITY OF A WIRELESS COMMUNICATION CONNECTION

CROSS REFERENCE TO RELATED APPLICATIONS

This application claims priority to U.S. Provisional Patent Application No. 62/544,275 filed Aug. 11, 2017 and titled "SYSTEMS AND METHODS FOR INCREASING WI-FI RELIABILITY." U.S. Provisional Patent Application No. 62/544,275 is hereby incorporated by reference.

FIELD

The present invention relates generally to wireless communication in connected systems. More particularly, the present invention relates to systems and methods for increasing the reliability of a wireless communication connection.

BACKGROUND

In known connected systems, such as security systems, it is common for a control panel or other device, such as an IoT device, in communication with a central monitoring station to lose wireless or Wi-Fi connectivity and, therefore, a wireless communication connection with the central monitoring station. To exit such a failure mode, an end user or a technician dispatched to a monitored region may power cycle a router that couples the control panel or the device to a wireless or Wi-Fi communication path. However, during the failure mode and prior to completion of such a power cycle, the control panel or the device is unable to communicate with the central monitoring station and, therefore, cannot receive remote services from the central monitoring station.

In view of the above, there is a continuing, ongoing need for improved systems and methods.

DETAILED DESCRIPTION

Figure 1:
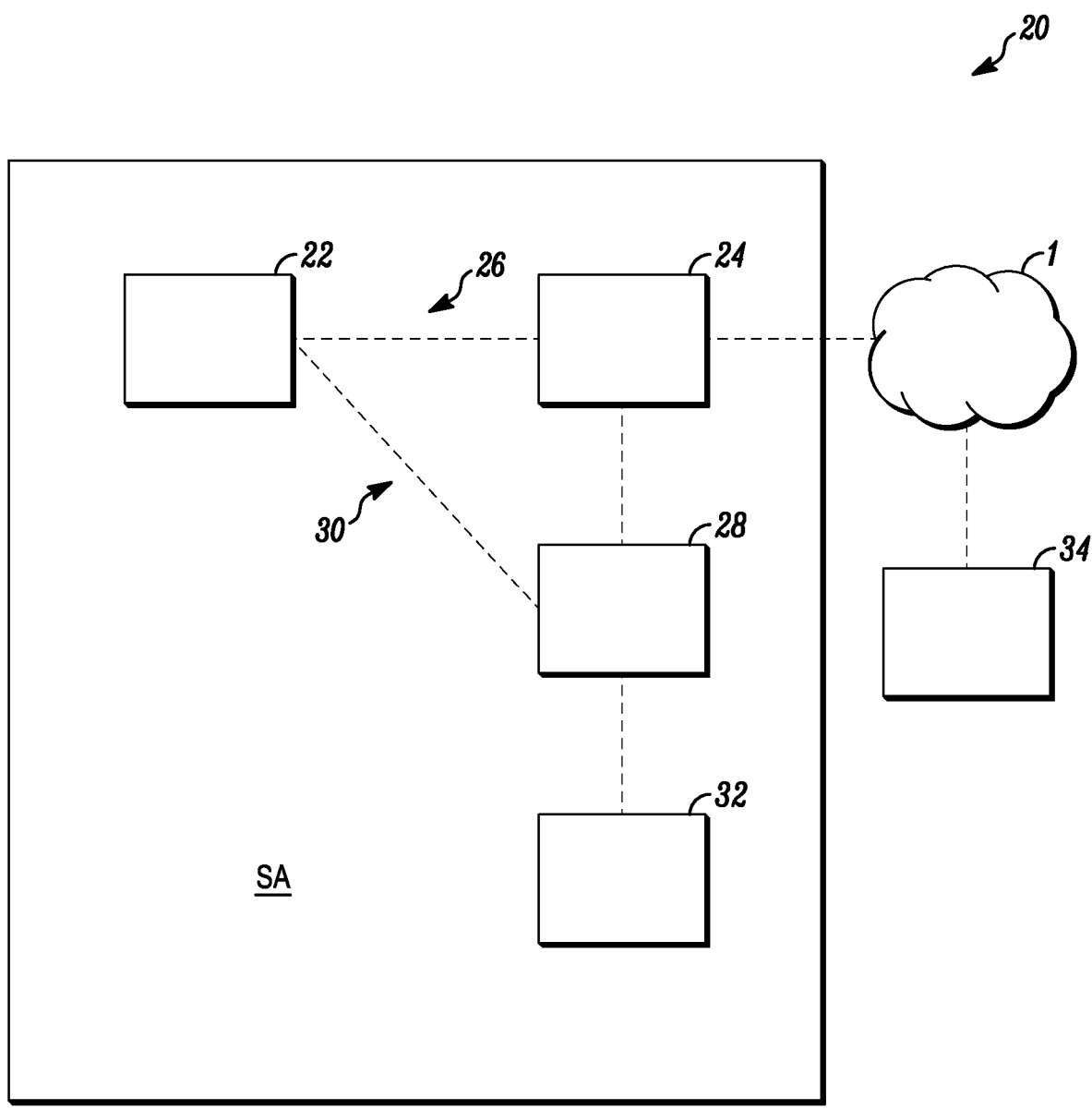
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for increasing the reliability of a wireless communication connection in a connected system, such as a security system. For example, a connection reliability module can be used in connection with a control panel or other device, such as an IoT device, that is coupled to a central monitoring station via a wireless or Wi-Fi communication path to restore wireless or Wi-Fi connectivity and, therefore, the wireless communication connection thereto. In some embodiments, the wireless communication connection can be a standard Wi-Fi connection. Accordingly, systems and methods disclosed herein can minimize (1) interruptions in the wireless or Wi-Fi connectivity and remote services that require the wireless communication connection to the central monitoring station and (2) instances of a technician being unnecessarily dispatched to a monitored region to restore the wireless or Wi-Fi connectivity.

In some embodiments, the connection reliability module disclosed herein can have an appearance similar to a Z-Wave plug. For example, a first side of the connection reliability module can include a plug that can be inserted into a wall receptacle to receive power therefrom, and a second side of the connection reliability module can include a plug that can be inserted into a wireless access point, a router, a gateway, or a cable modem that couples the control panel or the device to the wireless or Wi-Fi communication path.

In some embodiments, the control panel, the device, or a software application executing on the control panel or the device can detect a loss of the wireless or Wi-Fi connectivity to the wireless access point, the router, the gateway, the cable modem, or the Internet. Responsive to such detection, the control panel or the device can transmit a power cycle signal to the connection reliability module with instructions to cycle power to the wireless access point, the router, the gateway, or the cable modem. Responsive to receiving the power cycle signal, the connection reliability module can power cycle the wireless access point, the router, the gateway, or the cable modem, and in some embodiments, the connection reliability module can power cycle the wireless access point, the router, the gateway, or the cable modem a predetermined number of times or after the loss of the wireless or Wi-Fi connectivity for longer than a predetermined period of time.

In some embodiments, the connection reliability module can power cycle the wireless access point, the router, the gateway, or the cable modem by transmitting a restart signal to the wireless access point, the router, the gateway, or the cable modem instructing the wireless access point, the router, the gateway, or the cable modem to restart. Additionally or alternatively, in some embodiments, the connection reliability module can be coupled to a power source, can receive the power from the power source, can supply the power to the wireless access point, the router, the gateway, or the cable modem from the power source, and can power cycle the wireless access point, the router, the gateway, or the cable modem by switching off and on the power from the power source to the wireless access point, the router, the gateway, or the cable modem.

In some embodiments, the connection reliability module can communicate with and receive the power cycle signal from the control panel or the device via a SiX (RF6), Bluetooth, Bluetooth Low Energy, ZigBee, WiseLink, or Z-Wave communication protocol. However, embodiments are not so limited, and it is to be understood that the connection reliability module can communicate with the control panel or the device via any other communication protocol that would be known by one of ordinary skill in the art, including any communication protocol that is dissimilar from a communication protocol used by the wireless access point, the router, the gateway, or the cable modem, such as a Wi-Fi communication protocol.

In some embodiments, systems and methods disclosed herein can transmit or push a notification message to an end user, the technician, or the central monitoring station to provide notice of the loss of wireless or Wi-Fi connectivity and to provide notice of, restoration of the wireless or Wi-Fi connectivity.

FIG. 1 is a block diagram of a system 20 in accordance with disclosed embodiments. As seen in FIG. 1, the system 20 can include a control panel 22, a wireless access point 24 that connects the control panel 22 to the Internet I using a first wireless communication connection 26, a connection reliability module 28 that can send and receive signals from the control panel 22 using a second wireless communication connection 30, a power source 32, and a central monitoring station 34. As seen in FIG. 1 the connection reliability module 28 can be coupled to both the wireless access point 24 and the power supply 32. Accordingly, in some embodiments, the connection reliability module 28 can receive power from the power supply 32 and supply the power to the wireless access point 24. In some embodiments, the central monitoring station 34 can be coupled to the control panel 22 through the Internet I via the wireless access point 24, and in some embodiments, the control panel 22, the wireless access point 24, the connection reliability module 28, and the power supply 32 can be deployed in a secured area SA.

Figure 2:
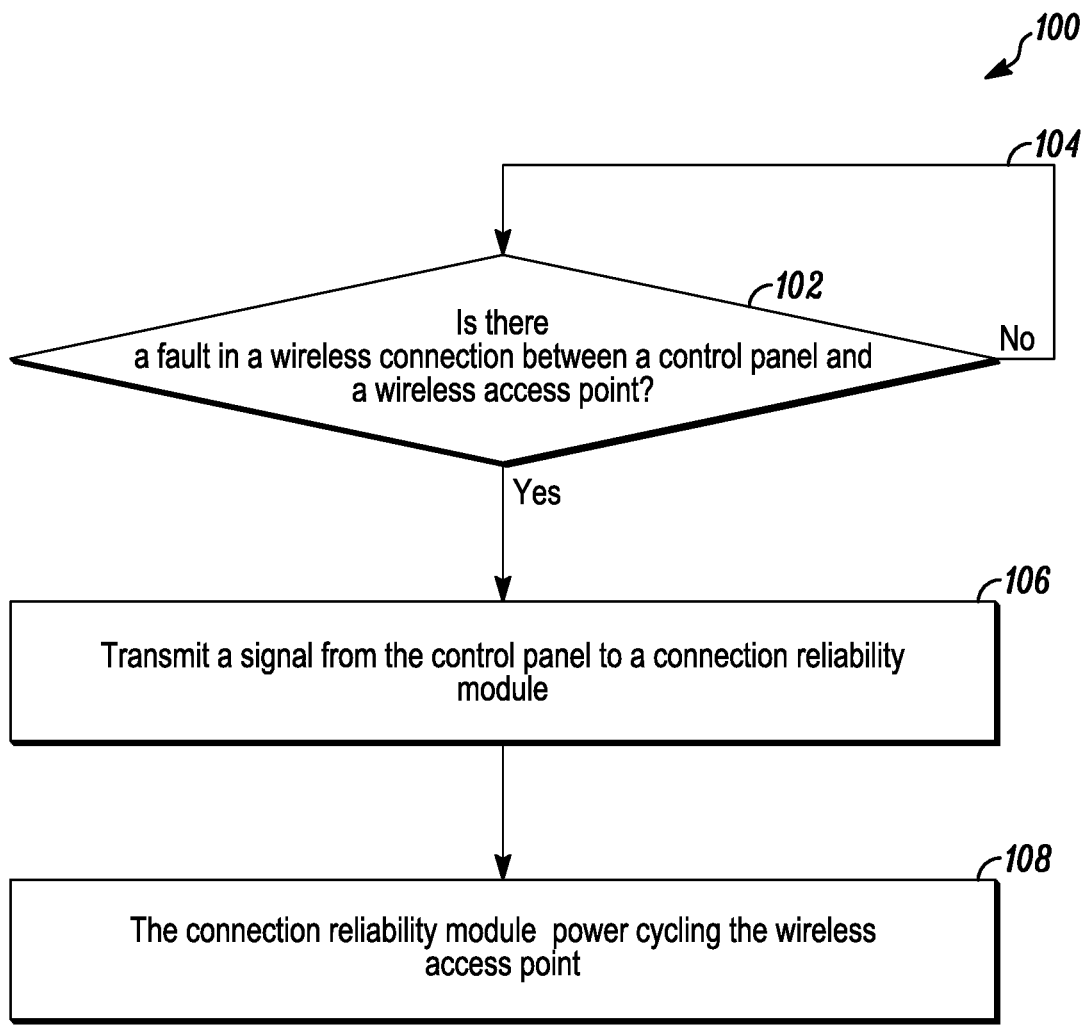
FIG. 2 is a flow diagram of a method in accordance with disclosed embodiments.

FIG. 2 is a flow diagram of a method 100 in accordance with disclosed embodiments. As seen in FIG. 2, the method 100 can include the control panel 22 determining whether a fault is present on the first wireless communication connection 26, as in 102. For example, the control panel 22 can determine that the fault is present on the first wireless communication connection 26 when the control panel 22 detects a loss of wireless or Wi-Fi connectivity with the wireless access point 24 via the first wireless communication connection 26. When no fault is detected, the method 100 can include the control panel 22 continuing to monitor for the fault, as in 104. However, when the fault is detected, the method can include the control panel 22 transmitting a power cycle signal to the connection reliability module 28, as in 106, and in response to receiving the power cycle signal from the control panel 22, the connection reliability module 28 power cycling the wireless access point 24, as in 108.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
   a secured area having:
      a control panel;
      a wireless access point that connects to the Internet and connects to the control panel via a first wireless communication connection, the first communication connection allowing the control panel to communicate through the wireless access point to the Internet; and
      a connection reliability module connected to the wireless access point via a second wireless communication connection that is different than the first wireless communication connection and connected to a power source that provides power through the connection reliability module to the wireless access point; and
      a central monitoring station located outside the secured area;
   wherein:
      when the control panel detects a fault on the first wireless communication connection, the control panel transmits a first signal to the connection reliability module via a third wireless communication connection that is different than the first and second wireless communication connections;
      the control panel transmits a notification message indicative of the fault on the first wireless communication connection to at least one of the central monitoring station, an end user of the control panel, or a technician assigned to the control panel;
      responsive to receiving the first signal, the connection reliability module power cycles, by interrupting a power signal between the power source and the wireless access point and transmitting a second signal to the wireless access point instructing the wireless access point to restart, whereby the second signal is one of a: Wi-Fi, SiX (RF6), Bluetooth, Bluetooth Low Energy, ZigBee, WiseLink, or Z-Wave communication protocol; and
      the control panel detects a resolution of the fault on the first wireless communication and connection and transmits a notification message indicative of the resolution of the fault on the first wireless communication connection to at least one of the central monitoring station, the end user of the control panel, or the technician assigned to the control panel.

2. The system of claim 1 wherein the control panel detects the fault on the first wireless communication connection responsive to the control panel failing to communicate with the central monitoring station, the wireless access point, or the Internet.

3. The system of claim 1 wherein the connection reliability module power cycles the wireless access point a predetermined number of times.

4. The system of claim 1 wherein the connection reliability module power cycles the wireless access point after a duration of the fault is greater than a predetermined period of time.

5. The system of claim 1 further comprising:
   the power source,
   wherein the connection reliability module is coupled to the power source, receives power from the power source, supplies the power to the wireless access point, and power cycles the wireless access point by switching off and on the power from the power source to the wireless access point.

6. The system of claim 1 wherein the wireless access point includes one of a router, a modem, or a gateway.

7. The system of claim 1 wherein the first wireless communication connection uses a Wi-Fi communication protocol and the second wireless communication connection uses one of a SiX (RF6), Bluetooth, Bluetooth Low Energy, ZigBee, WiseLink, or Z-Wave communication protocol.

8. A method comprising:
   providing in a secured area, a control panel, a wireless access point, and a connection reliability module having a first wireless communication connection between the control panel and the wireless access point, allowing the control panel to communicate through the wireless access point to the Internet,
   the control panel detecting a fault on the first wireless communication connection;

responsive to detecting the fault, the control panel transmitting a first signal to a connection reliability module via a second wireless communication connection that is different than the first wireless communication connection, wherein the first signal includes instructions for the connection reliability module to power cycle, by interrupting a power signal between a power source and the wireless access point and transmitting a second signal to the wireless access point instructing the wireless access point to restart, whereby the second signal is one of a: Wi-Fi, SiX (RF6), Bluetooth, Bluetooth Low Energy, ZigBee, WiseLink, or Z-Wave communication protocol;

the control panel communicating with a central monitoring station via the internet and transmitting a notification message indicative of the fault on the first wireless communication connection to at least one of the central monitoring station, an end user of the control panel, or a technician assigned to the control panel; and the control panel detecting a resolution of the fault on the first wireless communication connection and transmitting a notification message indicative of the resolution of the fault on the first wireless communication connection to at least one of the central monitoring station, the end user of the control panel, or the technician assigned to the control panel.

9. The method of claim 8 further comprising the control panel detecting the fault on the first wireless communication connection responsive to the control panel failing to communicate with the central monitoring station, the wireless access point, or the Internet.

10. The method of claim 8 further comprising the connection reliability module power cycling the wireless access point a predetermined number of times.

11. The method of claim 8 further comprising the connection reliability module power cycling the wireless access point after a duration of the fault is greater than a predetermined period of time.

12. The method of claim 8 further comprising:
the connection reliability module receiving power from the power source and supplying the power to the wireless access point; and
the connection reliability module power cycling the wireless access point by switching off and on the power from the power source to the wireless access point.

13. The method of claim 8 wherein the wireless access point includes one of a router, a modem, or a gateway.

14. The method of claim 8 wherein the first wireless communication connection uses a Wi-Fi communication protocol and the second wireless communication connection uses one of a SiX (RF6), Bluetooth, Bluetooth Low Energy, ZigBee, WiseLink, or Z-Wave communication protocol.

15. The system of claim 1, wherein the central monitoring station is coupled to the control panel.

16. The system of claim 15, wherein the central monitoring station is coupled to the control panel via the wireless access point.

17. The system of claim 1, wherein the power source is within the secured area.

18. The system of claim 1, wherein the control panel is configured to continuously monitor the first wireless communication connection for a fault.

19. The method of claim 1, wherein the power source is within the secured area.

* * * * *